United States Patent Office 2,780,348
Patented Feb. 5, 1957

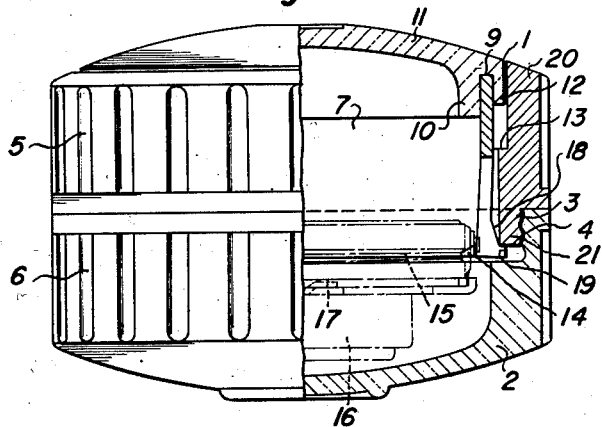
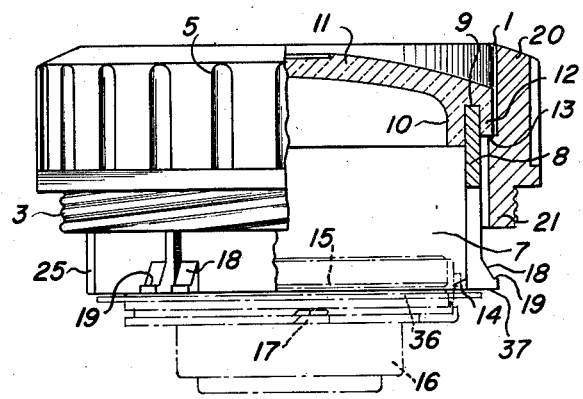
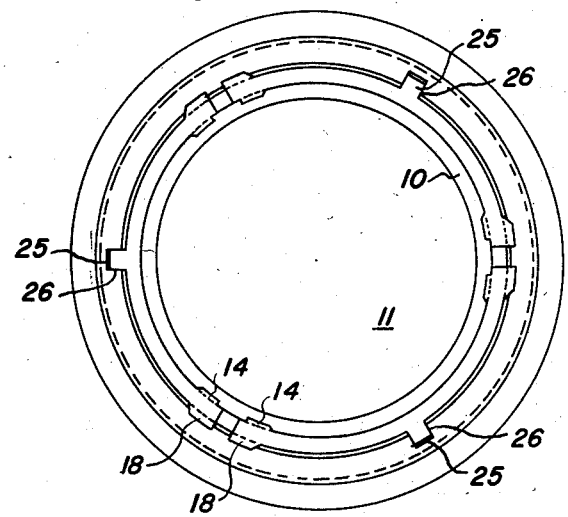

2,780,348

CONTAINER FOR PHOTOGRAPHIC OBJECTIVES, FILTERS, SUPPLEMENTARY LENSES, AND THE LIKE

Paul Gottlob Harter, Stuttgart-Wangen, and Kurt Alfred Steisslinger, Stuttgart-Hedelfingen, Germany, assignors to Eastman Kodak Company, Rochester, N. Y.

Application January 19, 1955, Serial No. 482,842

Claims priority, application Germany February 18, 1954

2 Claims. (Cl. 206—1)

This invention relates to photography and more particularly to containers for carrying photographic objectives, supplementary lenses, filters or the like, all of which may be called lens attachments and it is particularly directed to such a container in which there is a means for supporting such optical equipment against damage inside of a case preferably spaced from the outer walls of the case.

In known types of containers for lenses, supplementary lenses, filters and the like there have been several sections having outside walls which would protect the lenses or the like when the sections of the container were fastened together. However, most of these carried the supplemental lenses or the like in contact with the outside walls of the container, and, accordingly, they were subjected to any jolts or jars to which the container might be subjected and, in addition, in many cases it has been difficult to remove the optical equipment without touching the glass surfaces thereof. Thus, such containers have usually caused the supplemental lenses to be soiled and finger prints which could readily occur would often impair the definition of a resulting photograph taken through the optical equipment.

Our present container is especially designed to avoid these difficulties. One object of our invention is to provide a container with which a supplementary lens or the like may be placed on or removed from a lens mount without the fingers of the user ever touching either the glass portion or the rim portion of the optical equipment. Another object of our invention is to provide a container which may be readily manipulated to position the lens mount either in or out of the protecting container. A still further object of our invention is to provide a container in which the supplemental lens or the like may be engaged by spring fingers forming a part of one section of the container so that it may be readily handled through the engaging means rather than through direct handling. Other objects will appear from the following specification, the novel features being pointed out in the claims at the end thereof.

Coming now to the drawings in which like reference characters denote like parts throughout:

Fig. 1 shows a half section, half-side elevation of an optical element container constructed in accordance with and embodying a preferred form of my invention. In this figure the parts are shown in their optical element-engaging position;

Fig. 2 is a view similar to Fig. 1 with one section of the container unscrewed from the other section and with the optical element-engaging member in its normal rest position in which it may be removed from the optical element after having placed the optical element on an objective; and Fig. 3 is a bottom plan view of the parts shown in Fig. 2.

Our container consists broadly of three sections, the second and third of which may interengage by mating elements to provide a container with outside walls which protects the contents of the container against dirt and dust. A first container section may be provided with a spring retainer in the form of a cap with spring arms adapted to engage and hold an optical element through the engagement of the spring fingers therewith so that by placing this spring retainer in the proper position and moving it, the spring fingers may be moved to engage and hold the optical element, or conversely by moving the parts in an opposite direction, the spring fingers may be released.

More specifically our container includes second and third container sections 20 and 2 provided with mating threads 3 and 4 on telescoping portions of the container sections which may be turned to engage the two sections and form a "pill-box" like container having outside walls to protect against dust or dirt. If desired, the container sections may be knurled or roughened at 5 and 6 to facilitate moving one section into the other.

The first container section, here shown as 1, includes a spring retainer 7, this spring retainer consisting of a ring-like member 8 having the upper edge 9 embedded in a flange 10 on the cap 11 which forms a portion of an outside wall of container section 1. The cap-like member 11 is provided with a shoulder 12 adapted to mate with a shoulder 13 in a normal released position as shown in Fig. 2. In this position the fingers 14 carried by the spring retainer 7 are in their normal or rest position in which they lie out of a slot 15 in the optical element 16 adapted to be carried by the container.

This optical element or lens attachment 16 may be attachable by any known means such as a bayonet lock 17 to a lens barrel or to a shutter barrel and it may conveniently carry in the mount an objective element or a filter or the like, such as are commonly used in photography. On the outside of the spring fingers 14 there are cam surfaces 18 terminating in shoulders 19. The object of these cam surfaces is as follows: When the cap member 11 is depressed as shown in Fig. 2 so that the shoulders 12 and 13 engage, the ring-like member 20 lies out of engagement with the cam surface 18. However, the lower edge 21 of this ring-like member may be moved into telescoping engagement with the cam surface 18 by moving the cap-like member 11 upwardly to its upward extent of movement by moving the ring-like member 20 downwardly, thus camming the spring fingers 14 into tight engagement with the slotted area 15 in the optical element, thus suspending the optical element from the top or first section of the container. Thus, when the first section 1 is moved into the lower or third container section 2 by threads or other suitable means, the shoulder 21 is brought downwardly against the cam surface 18, locking the spring fingers in an operative lens element supporting position.

I find it generally convenient to have the normal position of rest of spring fingers adjacent to or actually in engagement with the lens element 16 so that even when in their normal position of rest they may form a light snap latch with the ring to facilitate positioning the optical element and removing it from its mount by means of the container section 1. If desirable, however, the spring fingers' normal position of rest may be entirely away from the edge of the lens mount although such an arrangement is not quite as easily operated.

It is our intention to provide a spring retainer of a flexible plastic material and this retainer may be anchored in the plastic by means of a plurality of lugs 25 which enter into slots 26 in the flange 10 of the cap-like member 11. Thus, there is no liability of having the ring-like member slip in the cap and it moves with it as a unit. In addition, it may be noted that the cap-like member 11 and its depending spring retainer may slide axially of the ring-like member 20 so that the spring retainer need not turn when the ring 20 is turned into threaded engagement with the opposite section 2 of the container.

The remaining portions of the container may also be made of clear, translucent or opaque plastic material if desired, although we prefer to form one section at least of the container of a transparent plastic so that the particular optical element which is enclosed in the container can be viewed from the outside thereof. Of course, if desired, parts of the container may be formed of any suitable material by molding, die casting, or the like, but for a container of this sort, because of its moderate cost and light weight, plastic material is generally desirable.

The operation of the embodiment of my invention shown in the drawings is quite simple. If an operator has an optical element or other lens attachment 16 in a closed container as in Fig. 1, it will be noticed that the optical element 16 is entirely supported by, in this instance, the three spring fingers 14 depending from the spring retainer 7. In this position the spring fingers 14 are, of course, unable to release the optical element because the shoulder 21 is in engagement with the cam surfaces 18 and since they have been sprung inwardly thereby. Thus, the optical element 16 is suspended in the casing without contacting with any of the outside walls of the container.

If it should be desired to place the optical element on a camera as, for instance, in the front lens barrel of a shutter, the third container section 2 is unscrewed from the second container section 20 while the first container section or the cap member 11 is retained in its uppermost position. Thus, the friction between the shoulder 21 and the cam surfaces 18 is such that the parts will remain in this position while an operator engages the optical element 16 with its camera mount. When the bayonet latch 17 or other fastening means has engaged the optical element with the camera mount, the cap 11 may be depressed relative to the ring-like member 20, thereby pulling upwardly the ring member 20 and releasing the interengaging edges 21 and cam surfaces 18 so that the container section 1 may be removed leaving the optical element in place.

These operations are reversed in taking the optical element off from its camera mount, the spring fingers 14 being engaged preferably in a groove 15 of a lens mount and by sliding the ring member 20 downwardly to engage the cams 18, the lens element may be frictionally engaged and removed from the camera lens mount so that when the remaining half 2 of the container is screwed into place by means of the threads 3 and 4, the two container elements will securely hold the lens element suspended in the container as indicated in Fig. 1.

Any suitable means may be provided for limiting the movement of the spring retainer 7 towards the element 16 to be carried. Thus in Fig. 2 the element 16 may have a flange 36 which may be engaged by the bottom wall 37 of the spring retainer 7 wherein the spring fingers 14 are in alignment with the groove 15. Thus with this arrangement the spring fingers 14 may normally lie out of contact with groove 15, but because of flange 36 may lie opposite groove 15 ready to be pressed into the groove when flange 36 lies adjacent bottom wall 37.

We have found that it is unnecessary to provide a groove 15 in the lens element 16 to be carried by the container as frictional contact is usually sufficient, particularly where the angle of the cams 18 is selected to readily spring the spring fingers 14 the required distance to firmly hold the lens element 16 or the like. We find, however, that grooves in the lens element are often preferable, particularly when this lens element is an interchangeable element of considerable weight as sometimes occurs where an interchangeable element carries a lens element which is used in connection with long focus objectives. Any suitable means of causing the spring fingers to firmly engage the mount of the lens or filter element may, of course, be used.

Where we refer in this specification and in the claims to "lens attachments," we intend this term to include all filters, supplementary lens attachments made of one or more lens elements in spherical or cylindrical form, lens elements, neutral density plates or wedges, sky filters, prism attachments all with or without supporting rings, or other elements which are customarily attached to objectives or parts of photographic objectives used for photographic cameras and projectors.

While we have shown and described a container for optical elements which is well adapted to carry out the objects of the invention, modifications will obviously occur to those skilled in the art. We consider as within the scope of our invention all such modifications as may come within the scope of the appended claims.

Having thus described my invention, what I claim as new and desire to secure by Letters Patent of the United States is:

1. A container for lens attachments comprising three sections, a first container section comprising a cap member and a plurality of flexible downwardly extending fingers carried thereby, said fingers having a normal rest position and said fingers having cam surfaces on their lower ends, a second container section having a slideway for the first container section, coacting abutments on the first and second container sections forming limits for the relative movement of the first and second container sections, the arms extending from the bottom of the second container section to engage and release a lens attachment when pressed into engagement therewith, means for securing the spring arms to a lens attachment by moving the first container section on the second including an abutment on the second section to engage cams on the spring arm to move said arms into contact with a lens attachment whereby said first and second container sections may serve as a lens attachment moving means, and a third container section fitting and having interlocking means of attachment to a complementary interlocking means carried by the second container section to enclose a lens attachment held by the spring arms protecting said attachment against dust and finger marks, said relatively movable first and second lens attachments including a cap member and a knurled edge positioned so that by applying pressure to the former pressing down on the cap the arms are released from the abutment and the spring arms may return to their rest position.

2. A container for lens attachments comprising three sections, a first container section comprising a cap member and a plurality of flexible downwardly extending fingers carried thereby, said fingers having a normal rest position and said fingers having cam surfaces on their lower ends, a second container section having a slideway for the first container section, coacting abutments on the first and second container sections forming limits for the relative movement of the first and second container sections, the arms extending from the bottom of the second container section to engage and release a lens attachment when pressed into engagement therewith, means for securing the spring arms to a lens attachment by moving the first container section on the second including an abutment on the second section to engage cams on the spring arm to move said arms into contact with a lens attachment whereby said first and second container sections may serve as a lens attachment moving means, and a third container section fitting and having interlocking means of attachment to a complementary interlocking means carried by the second container section to enclose a lens attachment held by the spring arms protecting said attachment against dust and finger marks, said relatively movable first and second lens attachments including a cap member and a knurled edge positioned so that by applying pressure to the former pressing down on the cap the arms are released from the abutment and the spring arms may return to their rest position in which the spring arms are positioned to frictionally engage the periphery of a lens attachment to be locked thereagainst by a reverse movement of the cap and knurled edge.

References Cited in the file of this patent

UNITED STATES PATENTS

| | | |
|---|---|---|
| 293,014 | Hanson et al. | Feb. 5, 1884 |
| 552,534 | Leukart et al. | Jan. 7, 1896 |
| 662,812 | Perry | Nov. 27, 1900 |
| 856,463 | Goss et al. | June 11, 1907 |
| 2,339,343 | Magnesen | Jan. 18, 1944 |
| 2,576,580 | Edwards | Nov. 27, 1951 |
| 2,645,375 | Topfer | July 14, 1953 |
| 2,678,128 | Sherman | May 11, 1954 |

FOREIGN PATENTS

| | | |
|---|---|---|
| 686,985 | Great Britain | Feb. 4, 1953 |
| 1,057,605 | France | Oct. 28, 1953 |